Sept. 2, 1958 W. W. COLLINS ET AL 2,849,980
ARTICLE CONVEYING AND SURFACING MACHINE
Filed Nov. 5, 1954 3 Sheets-Sheet 1
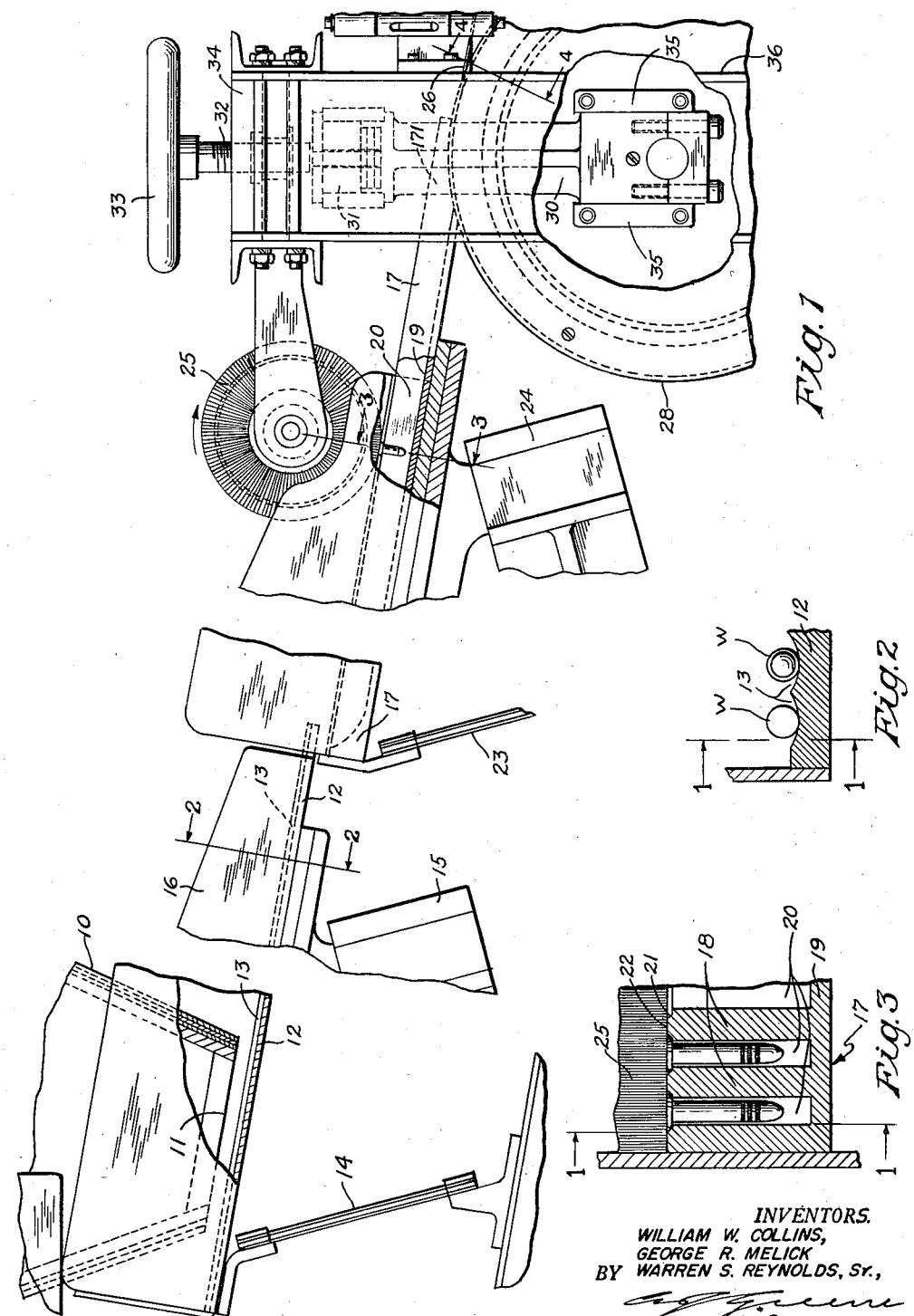
INVENTORS.
WILLIAM W. COLLINS,
GEORGE R. MELICK
BY WARREN S. REYNOLDS, Sr.,
ATTORNEYS Sept. 2, 1958 W. W. COLLINS ET AL 2,849,980
ARTICLE CONVEYING AND SURFACING MACHINE
Filed Nov. 5, 1954 3 Sheets-Sheet 2

INVENTORS.
WILLIAM W. COLLINS,
GEORGE R. MELICK
BY WARREN S. REYNOLDS, Sr.,

ATTORNEYS

Sept. 2, 1958 W. W. COLLINS ET AL 2,849,980
ARTICLE CONVEYING AND SURFACING MACHINE
Filed Nov. 5, 1954 3 Sheets-Sheet 3

INVENTORS.
WILLIAM W. COLLINS,
GEORGE R. MELICK
BY WARREN S. REYNOLDS, Sr.,

ATTORNEYS

2,849,980

ARTICLE CONVEYING AND SURFACING MACHINE

William W. Collins, Oxford, Ohio, and George R. Melick, Fairfield, and Warren S. Reynolds, Sr., Westport, Conn., assignors to Remington Arms Company, Inc., Bridgeport, Conn., a corporation of Delaware Application November 5, 1954, Serial No. 467,002

7 Claims. (Cl. 118—69)

This invention relates to apparatus for individually supporting longitudinal articles having a widened end portion in a continuously moving conveyor and for performing a surface finish operation on such articles without interrupting their continuous movement.

More specifically, the invention relates to apparatus for the lubrication of the bullets of rimmed cartridges which are individually supported in a conveyor while they traverse a bath of molten lubricant, and to means for loading and unloading the conveyor.

In the drawings:

Fig. 1 is a vertical side elevation, partly in section, of a portion of a machine embodying the invention, sections are on the lines 1—1 of Figs. 2 and 3.

Fig. 2 is a fragmentary vertical sectional elevation substantially on the line 2—2 of Fig. 1.

Fig. 3 is a fragmentary transverse sectional elevation substantailly on the line 3—3 of Fig. 1.

Fig. 5 is a fragmentary transverse sectional elevation substantially on the line 5—5 of Fig. 1a.

Fig. 6 is a fragmentary transverse sectional elevation substantially on the line 6—6 of Fig. 1a.

Figure 1A:
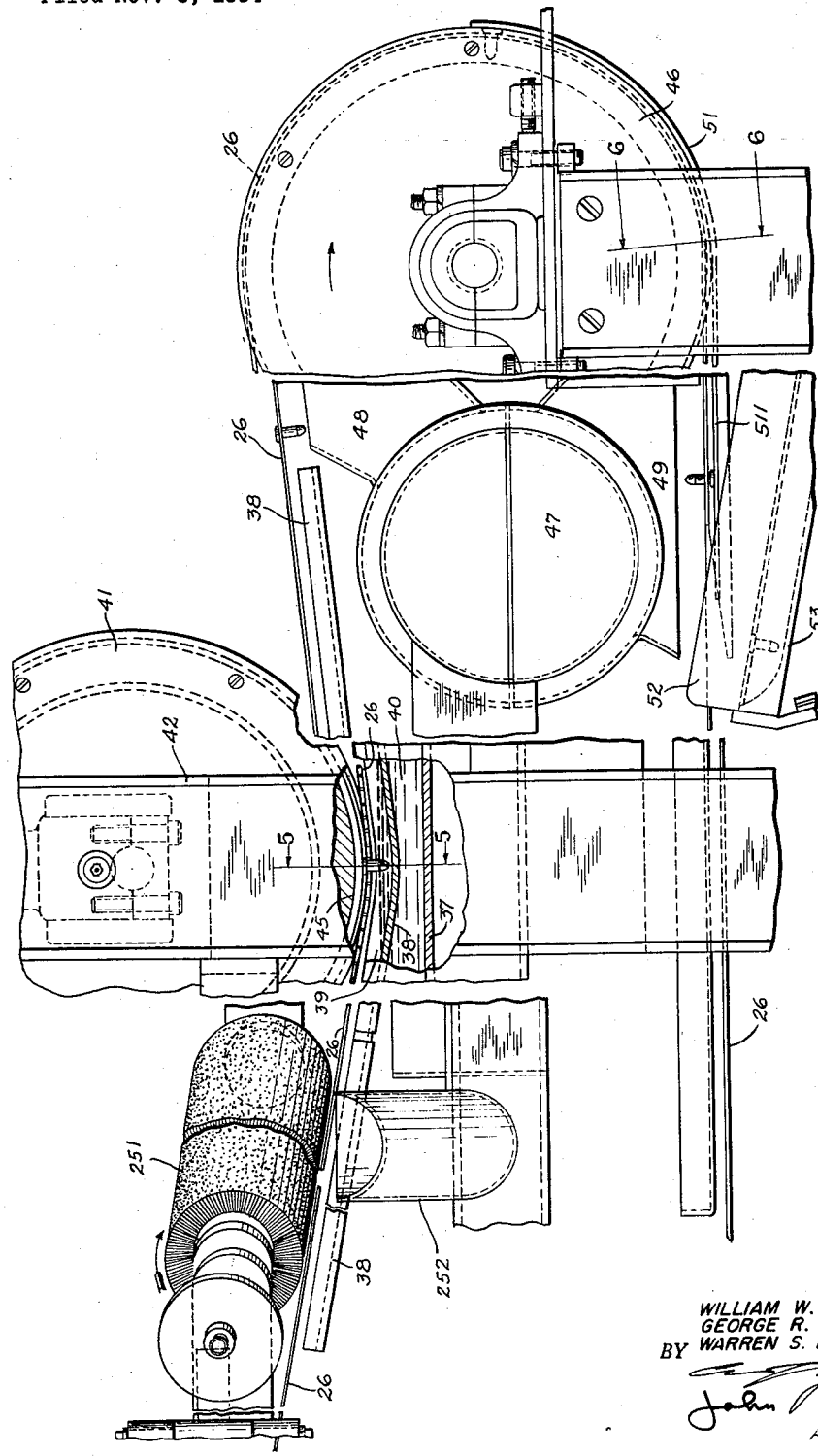
Fig. 1a is a continuation of Fig. 1, the two figures together constituting a substantially complete longitudinal side elevation. The sectioned portions of Fig. 1a are substantially on the lines 1a—1a of Figs. 4, 5 and 6.
Figure 4:
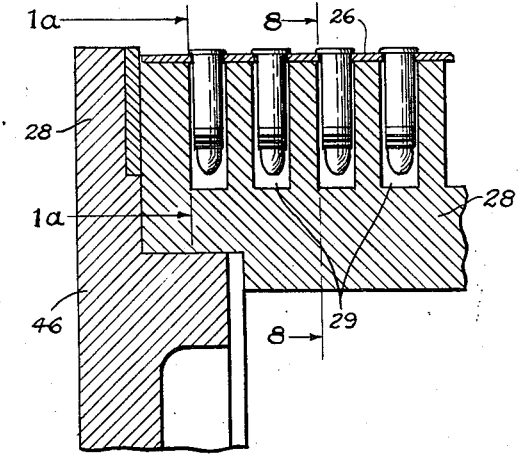
Fig. 4 is a fragmentary transverse sectional elevation substantially on the line 4—4 of Fig. 1.
Figure 5:
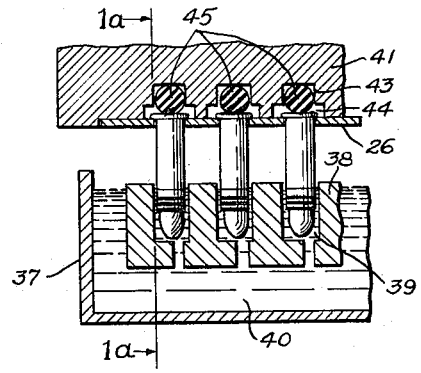

The cartridges to be processed are loaded into a hopper 10, a portion of which is shown at the left of Fig. 1. As clearly shown in several of the drawings, the cartridges comprise ogival bullets held in substantially cylindrical cases terminating in flanged or rimmed heads of greater diameter than the cases and forming a shoulder at the junction therewith. For effecting the purpose of the invention, it is necessary that the cartridges be arranged in uniform orientation and in spaced relation. The first movement is to arrange the cartridges in end-to-end relation in a plurality of columns in which they may be either end foremost. This is accomplished by providing beneath the bottom opening 11 of the conical hopper a vibrating trough plate 12 (Figs. 1 and 2) provided with a series of relatively wide and shallow troughs 13 extending away from the hopper bottom. The plate 12 and the hopper bottom may be of any desired width, to provide any desired number of troughs 13 and columns of cartridges or other workpieces W therein.

The invention contemplates delivering an ordered arrangement of cartridges having lubricated bullets to any one of a variety of packaging devices, and the number of columns or lines of cartridges formed may well depend upon the particular packaging apparatus. Machines have been constructed in which the plate 12 comprises as many as fifty cartridge holding troughs and series of other cartridge holding elements to be hereinafter described. The trough plate 12 may slope downwardly away from hopper bottom 11 and is preferably supported and vibrated by means of a flexible element 14 and a vibrating apparatus of commercial type, a fragment of which is shown at 15. Side plates 16 may be provided to prevent displacement of cartridges from the side margins of plate 12, and the vibration of plate 12 by vibrator 15 effects the alignment of the random arrangement of cartridges delivered thereto into columns in the respective troughs 13, in which columns the cartridges may lie either head forward or bullet forward.

The cartridges are delivered from the lower and outer end of plate 12 to a downwardly inclined vibrating groove plate 17 (Figs. 1 and 3) which consists essentially of a series of vertically disposed bars 18, the lower ends of which may be joined by web 19. Bars 18 are spaced from each other by an amount slightly greater than the body diameter but less than the head diameter of cartridges being processed, thus forming a series of parallel grooves 20, each adapted to support a row of cartridges. The grooves 20 in plate 17 are in substantial alignment with the troughs 13. At the upper end of each bar 18 is formed the cartridge rim supporting shoulders 21, above which the bars are narrowed, as shown at 22, to provide widened mouths for the grooves 20, thus facilitating the placement of cartridges therein. It will be apparent that cartridges dropping from the end of plate 12 upon plate 17 will enter the grooves 20 bullet-end-down and be supported by their rims upon the shoulders 21. Groove plate 17 is partially supported by a flexible member 23 and vibrated by the usual vibrator, indicated at 24. Adjacent the lower or delivery end of plate 17, and contacting the upper surfaces thereof, is a brush 25 which revolves in the direction indicated in Fig. 1 for the purpose of preventing the delivery of any cartridges which have failed to become suspended by their rims in grooves 20.

Figure 8:
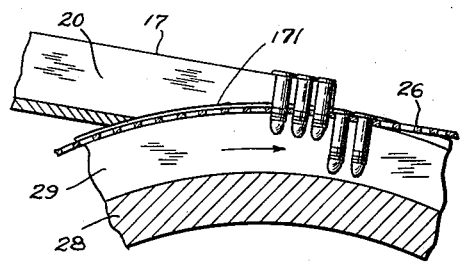
Fig. 8 is a fragmentary longitudinal sectional elevation showing the loading of the conveyor belt, the section being substantially on the line 8—8 of Fig. 4.

Cartridges are delivered from the lower end of groove plate 17 to a conveyor belt 26 (Figs. 1, 1a, 4, 5 and 7), which belt comprises rows of apertures 27 in alignment respectively with the grooves 20 in plate 17. These apertures are of such dimensions as to readily receive the bodies of the cartridges or other workpieces but not to pass the head portions, so that the workpieces are individually supported and suspended in the conveyor belt by their widened head portions. The spacing of the apertures 27 in each longitudinal row is preferably only slightly greater than the head diameter of a workpiece. The brush 25 facilitates the arrangement of cartridges in the grooves 20 with their heads or rims in abutting rather than overlapping relation; thus establishing the spacing of cartridges in the grooves substantially identical with the spacing of the support openings 27 (Fig. 8), thus facilitating the entrance of the cartridges into the openings 27. Adjacent the delivery end of groove plate 17, the conveyor belt 26 is carried by a drum 28 and the lower part of the end portion of plate 17 is cut away, as shown at 171 (Figs. 1 and 8), on an arc substantially conforming to the curvature of drum 28 and conveyor belt 26. Said drum 28 comprises cartridge-body-receiving slots 29 in alignment with grooves 20 in groove plate 17. The transfer of cartridges from plate 17 to conveyor belt 26 is clearly illustrated in Fig. 8. A diagonally disposed brush 251 (Fig. 1a) may revolve against the upper surface of belt 26 to remove any cartridges which fail to be properly suspended in an aperture 27 into a suitable receptacle indicated at 252.

The machine is particularly designed for the lubrication of .22 caliber rimmed cartridges, which cartridges are made in various lengths. It will be apparent that as the length of the cartridges varies it is desirable to vary the spacing between the delivery end of plate 17 and the conveyor belt 26. To provide for this, drum 28 may be supported in a yoke comprising side bars, one of which is shown at 30 (Fig. 1), and a top bar 31 apertured to receive the smooth end portion of a screw 32 provided with a hand wheel 33 and passing through a threaded opening in a frame member 34. Side bars 30 are guided between blocks 35 secured to the vertically disposed channel or other frame element 36.

The bullets of cartridges individually suspended in conveyor belt 26 are lubricated by traversing a bath of molten lubricant. The lubricant is contained in a shallow tank 37 and there is preferably associated with the lubricant-holding tank a channel plate 38 of the type described in the prior co-pending application of Schilling et al., Serial No. 289,832, filed May 24, 1952. Said plate comprises longitudinally disposed slots or channels 39 of such width and depth as to receive the bullets to be lubricated. Preferably, no part of the cartridge case in which the bullet is affixed enters channel 39 or contacts the lubricant. Channels 39 are aligned respectively with the lines of apertures 27 in conveyor belt 26. Lengthwise, the channel plate has the configuration of a very wide V, the mid-portion thereof being immersed in molten lubricant 40 contained in tank 37 to such an extent that the lubricant just reaches the surface of the plate. Suitable means are provided for supplying lubricant to tank 37, maintaining the lubricant in the tank at the desired level, and for heating the lubricant to the desired temperature; these means are not illustrated, since they form no part of the present invention. The channel plate being of heat conductive metal, such as aluminum, the portion thereof which is immersed in the lubricant is at lubricant temperature, and the temperature of the plate gradually diminishes toward the end portions thereof not immersed in the lubricant. Thus, the bullets to be lubricated are pre-heated before being immersed in the lubricant, and after emerging from the lubricant are in juxtaposition to metal of gradually diminishing temperature. Excessive lubrication is thereby obviated.

To cause the conveyor belt 26 to follow the configuration of the channel plate, said belt passes beneath a drum or roller 41 (Fig. 5) which is mounted for vertical adjustment in fixed frame members, one of which is shown at 42, in the same manner as drum 28 above-described. Drum 41 is provided with peripheral recesses 43 preferably having widened mouth portions 44 adapted to receive the heads of cartridges suspended in the apertures 27 of conveyor belt 26. Recesses 43 are in alignment with conveyor belt apertures 27 and channels 39, and each recess contains a ring 45 of deformable material, such as rubber, neoprene or the like, adapted to form a bearing for the cartridge head. Adequate holding of the cartridges during lubrication is thus provided without the hazard of severely gripping the explosive-containing rims of the cartridges between opposed metallic members.

Figure 6:
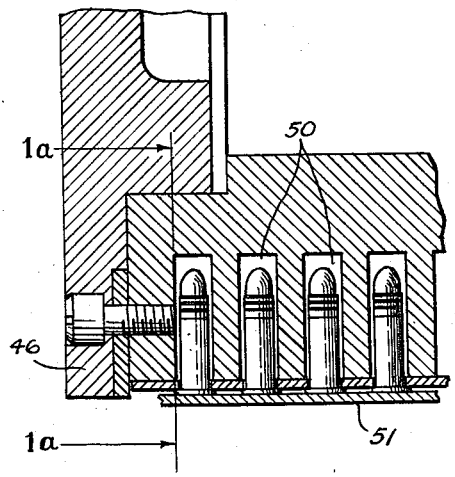
Figure 7:
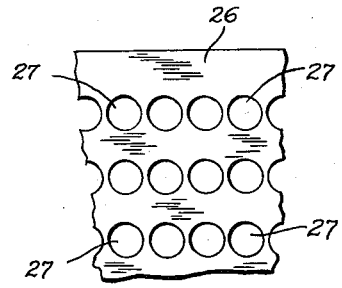
Fig. 7 is a fragmentary plan view of the conveyor belt.

Beyond channel plate 38, the apertured conveyor belt 26 traverses a drum 46 (Figs. 1a and 6). At this point, means are provided for completely solidifying the lubricant which has been applied to the bullets, so that the cartridges may be immediately handled into suitable packaging containers. This means may comprise a blower indicated at 47 (Fig. 1a) and passages 48 and 49 from said blower adapted to deliver a current of air at a suitable temperature to the reaches of the conveyor belt 26 respectively above and below the drum 46. The construction of drum 46 is similar to that of drum 41, comprising cartridge body receiving slots 50, as shown in Fig. 6. Surrounding the lower quadrant of drum 46, which is traversed by conveyor belt 26, is a cartridge supporting plate 51 comprising a flat extension 511 underlying a portion of the horizontal reach of conveyor belt 26 adjacent drum 46. The manner in which plate 51 comes to support cartridges in conveyor belt 26 as they pass the lower quadrant of drum 46 and assume upright positions is clearly illustrated in Fig. 6. Said supporting plate extension 511 terminates between guide wings 52 extending upwardly from the margins of a receiving plate 53 which may be of a construction comparable with that of groove plate 17 and is adapted to deliver an ordered arrangement of cartridges to any desired type of counting and/or packaging apparatus, not illustrated since they form no part of the present invention.

What is claimed is:

1. Apparatus for operating on cartridges having flanged heads, said apparatus comprising a conveyor belt having formed therein a plurality of individual apertures arranged in a plurality of rows lengthwise of said conveyor belt and of such diameter that each aperture may receive the body of a cartridge for support by its head flange, a supporting drum for said conveyor belt having therein peripheral cartridge body receiving grooves aligned respectively with the rows of individual cartridge apertures in said conveyor belt, and means to arrange said cartridges in a plurality of rows in head-up orientation and to deliver said oriented cartridges from said rows to said conveyor belt apertures, said arranging and delivering means comprising a set of spaced bars inclined toward a loading point at which said conveyor belt traverses said drum, said bars being disposed as parallel tracks supporting rows of cartridges by their head flanges in alignment with said rows of apertures in said conveyor belt, the lower ends of said tracks at said loading point overlying said conveyor belt and said drum, and being spaced therefrom by an amount less than the length of the cartridges being transported, whereby cartridges are delivered from said tracks to said apertures.

2. Apparatus according to claim 1, said loading point being disposed in the area where said tracks and said belt are each in substantially tangential relationship to the surface of said drum.

3. Apparatus for operating on cartridges having flanged heads, said apparatus comprising a conveyor belt having formed therein a plurality of individual apertures arranged in a plurality of rows lengthwise of said conveyor belt and of such diameter that each aperture may receive the body of a cartridge and support said cartridge by its head flange, means for applying a coating to a portion of each of said cartridges supported by said conveyor belt, comprising a container for coating material disposed beneath said belt, and a guide drum overlying said belt in opposition to said container, said drum having therein shallow peripheral cartridge head receiving grooves aligned respectively with the rows of individual cartridge apertures in said conveyor belt, said grooves minimizing pressure on the flanged heads of said cartridges while said cartridges are confined between said belt and said guide drum.

4. Apparatus according to claim 3, in which each of said grooves contains a ring of resilient material adapted for engagement by the heads of cartridges in the associated row in said conveyor belt.

5. Apparatus for lubricating cartridges having flanged heads, said apparatus comprising a conveyor belt having formed therein a plurality of individual apertures arranged in lengthwise rows, said apertures being of such diameter that each aperture may receive the body of a cartridge and suspend said cartridge by its head flange, a guide drum overlying said belt and in peripheral engagement therewith, a molten lubricant receptacle underlying said belt in opposition to said drum and disposed to be traversed by rows of cartridges carried by said belt, a plate of heat conducting material extending along the path of travel of said belt and having a portion immersed in molten lubricant in said receptacle, said heat conducting plate having longitudinal channels therein disposed to be traversed by rows of cartridges in said belt, whereby heat conducted from said molten lubricant by said plate causes rows of cartridges to be gradually heated before lubrication and gradually cooled thereafter.

6. Apparatus according to claim 5, comprising a drum traversed by a reach of said conveyor belt carrying lubricated cartridges, said drum comprising peripheral slots adapted to receive the bodies of cartridges in said conveyor belt.

7. Apparatus according to claim 6, comprising means for cooling and solidifying the lubricant on the bullets of cartridges in transit to and around said drum.

References Cited in the file of this patent

UNITED STATES PATENTS

| | | |
|---|---|---|
| 676,761 | Morris | June 18, 1901 |
| 1,063,588 | Peterson | June 3, 1913 |
| 1,185,329 | Janish | May 30, 1916 |
| 2,411,042 | King et al. | Nov. 12, 1946 |
| 2,442,179 | Shanklin et al. | May 25, 1948 |
| 2,728,260 | Mills et al. | Dec. 27, 1955 |